Aug. 21, 1945.  L. A. LEHRMAN  2,383,265
SNUBBER
Filed July 27, 1942
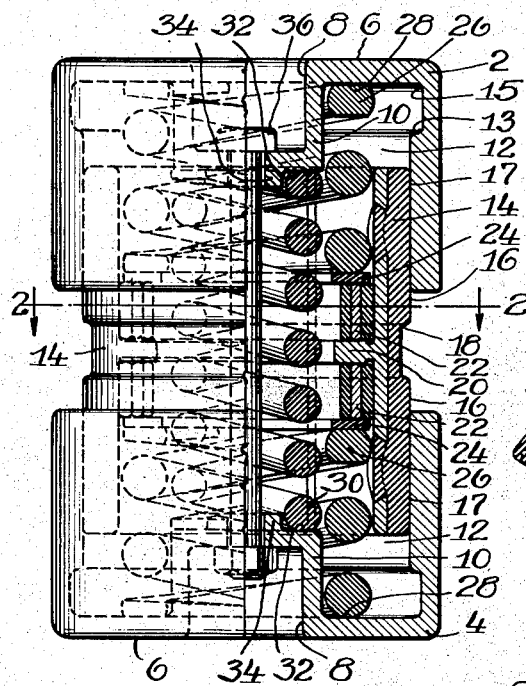
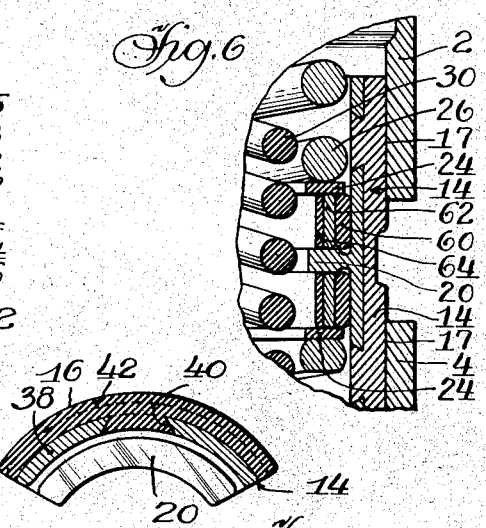
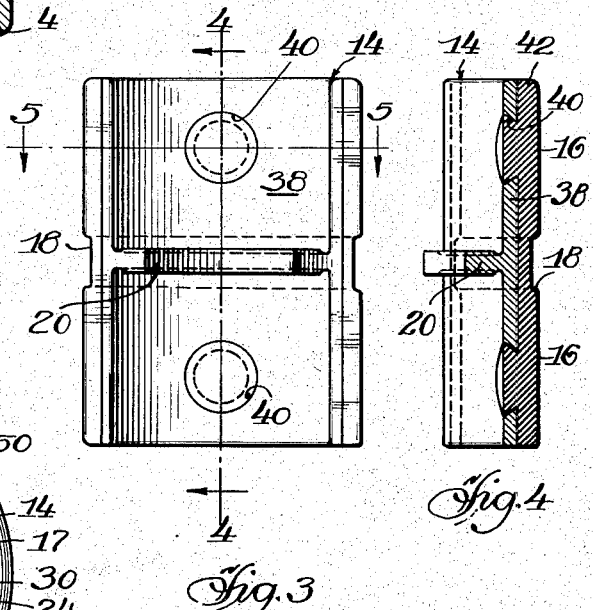
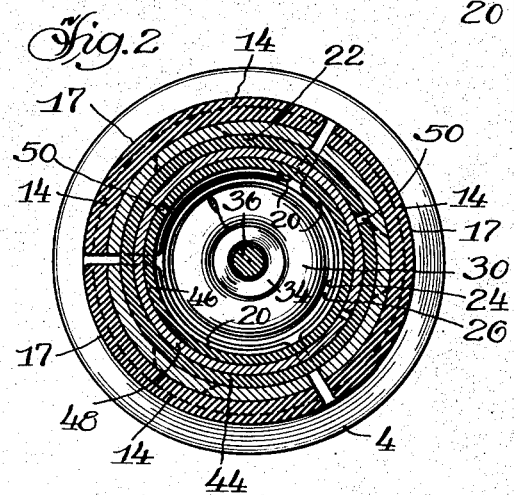
INVENTOR.
Leo A. Lehrman
BY
Atty.

Patented Aug. 21, 1945

2,383,265

UNITED STATES PATENT OFFICE 2,383,265

SNUBBER

Leo A. Lehrman, Chicago, Ill., assignor to American Steel Foundries, Chicago, Ill., a corporation of New Jersey Application July 27, 1942, Serial No. 452,425

16 Claims. (Cl. 267—9)

My invention relates to a friction device sometimes called a snubber and more particularly such an arrangement wherein identical top and bottom followers may be afforded friction surfaces for engagement with a plurality of friction shoes supported therebetween.

The general object of my invention is to devise a friction absorbing device of relatively simple construction which will develop satisfactory frictional absorption and in which relatively large friction surfaces may be used in order to afford relatively long wear under hard service.

A more specific object of my invention is to devise such a snubber as above referred to wherein identical top and bottom followers may be formed with cylindrical internal friction surfaces against which a plurality of shoes may be seated, said shoes being so arranged as to accommodate therewithin an expansion ring, or ring spring as it is sometimes designated, which may function to urge the shoes into engagement with the followers.

My device contemplates an arrangement wherein one or more such ring springs may be utilized, concentrically arranged, such a setup permitting the use of expansion rings of the most desirable shape.

In the drawing, Figure 1 is a view of one embodiment of my novel form of snubber, the left half of the figure being in elevation and the right half thereof in section, the section being taken substantially in a plane bisecting the device in a vertical plane and extending through the middle of one shoe. Figure 2 is a horizontal sectional view taken approximately in the plane indicated by the line 2—2 of Figure 1.

Figures 3, 4 and 5 illustrate my novel form of friction shoe, Figure 3 being a view in elevation taken from the inner face of the shoe, Figure 4 being a sectional view taken in the vertical plane bisecting the shoe as indicated by the line 4—4 of Figure 3, and Figure 5 being a further sectional view taken approximately in the horizontal plane indicated by the line 5—5 of Figure 3.

Figure 6 is a fragmentary sectional view corresponding to the view at the right of Figure 1 but showing a modification of my invention.

In detail, my novel snubber structure comprises identical top and bottom followers 2 and 4 of barrel-like form, each presenting an outer face 6 affording a seat for one end of the device. Centrally of each face 6 may be formed a recess 8 within which may be received a boss or other positioning means, the said recess being defined by the walls of the inwardly projecting boss 10 of each follower. As already indicated, each follower is a cup-like or barrel-like structure having vertical cylindrical friction walls, each presenting on its inner surface an annular friction face 12 against which may seat a plurality of friction shoes 14, 14, the inner edge of each friction face 12 being formed by the shoulder 13 defining in part the annular channel 15, said channel forming a relieved portion to prevent the wearing of shoulders on the follower.

As illustrated, my device comprises three friction shoes 14 but a larger number might be used if desired, or, in fact, two shoes, semi-cylindrical in form, might be used. Each friction shoe 14 is of novel form, the detailed structure of which is hereinafter described, and each shoe presents on its outer face a plurality of friction surfaces 16, 16 complementary in form to the friction faces 12, 12 of the followers and in abutment therewith as at 17, 17. The said frictin surfaces 16, 16 on each shoe are spaced apart by the horizontal annular channel or groove 18, said groove affording a relieved area between the respective friction surfaces 16, 16, thus preventing the formation of shoulders therebetween as the device may be worn in use.

Each shoe 14 presents on its inner face an arcuate flange 20, said flange presenting on its top and bottom faces seats for the ring spring assemblies, generally designated 22, 22, each of said assemblies comprising a plurality of expansion rings concentrically arranged, the outermost of said rings seating against the respective friction shoes to urge them into engagement with the followers as already described. Outwardly of each ring spring assembly may be positioned a washer 24 affording a seat for one end of the associated outer compression spring 26. Each washer 24, if desired, may also be formed as a ring spring, slotted to permit some compression or expansion thereof. The opposite end of each outer compression spring 26 may seat as at 28 on the base of the adjacent follower. Concentrically arranged within the springs 26, 26 may be the inner compression spring 30, opposite ends of which may seat as at 32, 32 on the bosses 10, 10 inwardly projecting from bases of the respective followers, each boss 10 being formed with an annular flange 34 affording positioning means for the adjacent end of the spring 30. The parts may be held in normal relationship by the bolt and nut assembly 36, opposite ends of which are housed within the before-mentioned recesses 8, 8.

The friction shoe 14 is illustrated in detail in Figures 3, 4 and 5. In the embodiment shown, three shoes are used and therefore each seats against approximately one hundred twenty degrees of the follower friction face 12. Each shoe is a composite structure, arcuate in form, and includes a steel member 38 defining the form or frame of the shoe, said member 38 having as a part thereof the before-mentioned horizontal arcuate flange 20 serving as a seating means for the ring spring assembly. Centrally arranged above and below the flange 20 each steel member 38 may have one or more eyes or openings 40, 40 defined by sloping walls converging toward the outer face of the shoe, said openings affording keying means for the hard cast iron outer facing portion 42 of the shoe. The iron face of each shoe may be chill cast against the steel member 38, thus being integrally formed therewith and keyed thereto by flowing the molten iron into the before-mentioned openings 40, 40. Each shoe presents in its outer face a horizontal groove or channel 18, as already described, thus separating the upper and lower friction surfaces 16, 16.

As already intimated, I may utilize a pair of semi-cylindrical friction shoes instead of three as here illustrated, or I may utilize a larger number than three where such a structure is better adapted for the use to be served.

As illustrated in Figure 1, the ring spring assembly 22 comprises an outer ring 44, an inner ring 46 and an intermediate ring 48. It will be understood, of course, that a larger or smaller number of rings may be utilized in the ring spring assembly as desired and depending upon the characteristics sought to be secured in the ring spring assembly as a whole. Each ring of the expansion assembly is slotted, the ends thereof being closely adjacent each other as at 50, 50 when the parts are in assembled relationship. When the parts are dismantled and the ring springs are released, naturally they assume an expanded or relatively open position. As illustrated, each ring spring has a flat section with arcuate top and bottom edges as may be noted in the sectional view of Figure 1.

Figure 6 is a fragmentary sectional view corresponding to the sectional view at the right of Figure 1 but showing a modification of my invention in which the top and bottom followers 2 and 4 engage at 17 the friction shoes 14, 14, each friction shoe comprising the flange 20 affording a seat on the top and bottom thereof for the respective ring spring assemblies, said assemblies affording seats for the washers 24, 24 which in turn afford seats for respective outer coil springs 26, 26 as in the previous modification. It will be apparent that this modification is substantially identical with that disclosed in Figures 1 to 5 inclusive except for the fact that each ring spring assembly comprises the outer ring spring 60 seated against the friction shoe 14, the intermediate ring spring 62 and the inner ring spring 64 said ring springs being of progressively varying thicknesses with the outer ring spring 64 being the thickest of the assembly.

In operation, substantially constant friction will be developed by the device although after long wear, when the friction faces on the followers and shoes have been somewhat worn, a slight reduction in shoe pressure may result in somewhat less friction. It will be understood, however, that the ring spring assembly may be so designed as to permit a reasonable amount of such wear without too great reduction in the resulting frictional capacity.

It is to be understood that I do not wish to be limited by the exact embodiments of the device shown which are merely by way of illustration and not limitation as various and other forms of the device will, of course, be apparent to those skilled in the art without departing from the spirit of the invention or the scope of the claims.

I claim:

1. In a friction device, top and bottom followers presenting inner cylindrical friction faces, a plurality of arcuate friction shoes having friction surfaces seated against said faces, a ring spring assembly confined within said shoes urging them outwardly into engagement with said followers, and a plurality of compression springs housed within said followers, certain of said compression springs extending between said followers and other of said compression springs being confined within the respective followers and seating against said assembly.

2. In a friction device, spaced followers presenting internal cylindrical friction surfaces, friction shoes in complementary engagement therewith, each shoe presenting a central annular flange, expansion rings above and below said flanges urging said shoes into engagement with said followers, and compression springs housed within said followers, one of said compression springs seating at opposite ends against respective followers and other of said compression springs seating against said expansion rings at adjacent ends and against said followers at remote ends.

3. In a snubber, top and bottom followers presenting internal cylindrical friction surfaces, a set of friction shoes in complementary engagement with said surfaces, an expansion spring assembly urging said shoes outwardly, and a plurality of compression springs between said followers, certain of said compression springs having abutment with both of said followers and other of said compression springs abutting said followers respectively and seating against said expansion spring assembly.

4. A compression friction shoe having the general contour of a section of a cylinder, comprising a perforated steel member and an iron element cast thereon and projecting within the perforations thereof, said steel member presenting on the inner face of said shoe an annular reinforcing flange affording a spring seat, said iron element presenting spaced friction faces defined in part by an intervening channel.

5. In a friction device, top and bottom followers, friction shoes seated against said followers, an expansion ring assembly confined within said shoes urging said shoes outwardly against said followers, release spring means compressed between said followers, said release spring means comprising a spring seating against both of said followers and other springs seating against respective followers at their remote ends and against said assembly at their adjacent ends, and horizontally aligned flanges on said shoes extending inwardly therefrom affording seats for said expansion ring assembly.

6. In a friction device, identical top and bottom followers, a plurality of friction shoes seated against said followers, a ring spring assembly urging said shoes into engagement with said followers, and a plurality of release springs within said device, certain of said release springs abutting respective followers and other of said release springs being housed within respective followers and seating against said ring spring assembly.

7. In a snubber, top and bottom followers presenting internal cylindrical friction surfaces, a set of friction shoes in complementary engagement with said surfaces, an expansion ring spring urging said shoes outwardly, a plurality of compression springs between said followers, certain of said compression springs having abutment with both of said followers and other of said compression springs abutting respective followers and seating against said expansion spring, and horizontally aligned seating means on said shoes for said expansion spring.

8. In a friction device, spaced followers presenting internal cylindrical friction surfaces, friction shoes in complementary engagement therewith, each shoe presenting a central annular flange, expansion rings above and below said flanges urging said shoes into engagement with said followers, and a compression spring extending between said followers.

9. In a friction device, spaced followers presenting internal cylindrical friction surfaces, friction shoes in complementary engagement therewith, each shoe presenting a central annular flange, expansion rings above and below said flanges urging said shoes into engagement with said followers, and compression springs housed within said followers.

10. In a friction device, top and bottom followers presenting inner cylindrical friction faces, a plurality of arcuate friction shoes having friction surfaces seated against said faces, a ring spring assembly confined within said shoes urging them outwardly into engagement with said followers, a compression spring between said followers, said assembly comprising top and bottom sets of ring springs, and horizontally aligned positioning means on said shoes for said ring springs.

11. In a friction device, identical top and bottom followers, a plurality of friction shoes seated against said followers, a ring spring assembly urging said shoes into engagement with said followers, and a plurality of release springs within said device, certain of said release springs abutting respective followers and another of said release springs abutting both of said followers, each of said shoes comprising a steel member and an iron element cast thereon, said steel member presenting on one face of said shoe an annular reinforcing flange affording a spring seat.

12. In a snubber, top and bottom followers presenting internal cylindrical friction surfaces, a set of friction shoes in complementary engagement with said surfaces, vertically spaced ring spring assemblies each comprising a plurality of concentrically arranged compression ring springs urging said shoes outwardly, and a compression spring extending between said followers, said shoes having horizontally aligned arcuate flanges affording seats for said ring springs.

13. In a snubber, top and bottom followers presenting internal cylindrical friction surfaces, a set of friction shoes in complementary engagement with said surfaces, an expansion spring assembly urging said shoes outwardly, and a plurality of compression springs between said followers, certain of said compression springs being compressed between and reacting against respective followers and adjacent portions of said assembly and another of said compression springs being compressed between both of said followers.

14. In a friction device, identical top and bottom followers, a plurality of friction shoes seated against said followers, a plurality of ring spring assemblies urging said shoes into engagement with said followers, and a release spring extending between said followers, each of said assemblies comprising a plurality of concentrically arranged ring springs of progressively increasing section from the ring of minimum diameter to the ring of maximum diameter.

15. In a friction device, top and bottom followers, friction shoes seated against said followers, an expansion ring assembly urging said shoes against said followers, and release spring means compressed between said followers, said assembly comprising top and bottom series of rings, each of said series including concentrically arranged rings of progressively increasing thickness from the ring of minimum diameter to the ring of maximum diameter.

16. In a friction absorbing device, spaced followers, friction shoes in engagement therewith, and an assembly of radially disposed ring expansion springs of progressively varying thicknesses urging said shoes into said engagement, said assembly comprising a top series and a bottom series of ring springs and said friction shoes having horizontally aligned flanges affording seats for said expansion springs.

LEO A. LEHRMAN.